(12) United States Patent
Kishihara et al.

(10) Patent No.: US 11,181,160 B2
(45) Date of Patent: Nov. 23, 2021

(54) COIL SPRING

(71) Applicants: Suncall Corporation, Kyoto (JP); Toyota Jidosha Kabushiki Kaisha, Toyota (JP)

(72) Inventors: Ryuji Kishihara, Kyoto (JP); Seiji Okamura, Toyota (JP)

(73) Assignee: Suncall Corporation

( * ) Notice: Subject to any disclaimer, the term of this patent is extended or adjusted under 35 U.S.C. 154(b) by 481 days.

(21) Appl. No.: 16/093,496

(22) PCT Filed: Feb. 7, 2017

(86) PCT No.: PCT/JP2017/004338
§ 371 (c)(1),
(2) Date: Oct. 12, 2018

(87) PCT Pub. No.: WO2017/179273
PCT Pub. Date: Oct. 19, 2017

(65) Prior Publication Data
US 2021/0190162 A1 Jun. 24, 2021

(30) Foreign Application Priority Data
Apr. 13, 2016 (JP) .............................. JP2016-080015

(51) Int. Cl.
*F16F 1/04* (2006.01)
*F16F 1/06* (2006.01)
*F16F 1/12* (2006.01)

(52) U.S. Cl.
CPC ............... *F16F 1/06* (2013.01); *F16F 1/047* (2013.01); *F16F 1/123* (2013.01); *F16F 2238/026* (2013.01)

(58) Field of Classification Search
CPC .... F16F 1/047; F16F 1/06; F16F 1/123; F16F 2238/026; B60G 2202/12
See application file for complete search history.

(56) References Cited

U.S. PATENT DOCUMENTS 2,260,606 A 10/1941 Clark
3,964,736 A * 6/1976 Huhnen ................. F16F 1/123
267/166

(Continued)

FOREIGN PATENT DOCUMENTS

FR 2 550 295 A1 2/1985
JP 10-184751 7/1998

(Continued)

OTHER PUBLICATIONS

International Search Report issued in corresponding International Application No. PCT/JP2017/004338, dated Apr. 25, 2017.

(Continued)

*Primary Examiner* — Thomas W Irvin
(74) *Attorney, Agent, or Firm* — Sterne, Kessler, Goldstein & Fox P.L.L.C.

(57) ABSTRACT

In the coil spring of the present invention, a helical space defined by a space between coils has a first end region whose space is increased as it extends towards the other side in the axial direction from a first reference point where the space is zero, a reference region whose space is set at a reference value L (L>0), and a second end region whose space becomes narrow as it extends toward the other side in the axial direction and zero at a second reference point. The first end region is configured such that the number of turns of the helical space is greater than 1 and the space between coils in a terminal position is greater than the reference value L. The helical space has a first transitional region between the terminal position of the first end region and the reference region, the first transitional region being configured so that the distance of space between coils is reduced from the terminal position of the first end region along the helical shape of the helical space toward the other side in the axial direction and becomes the reference value L.

6 Claims, 7 Drawing Sheets

(56) References Cited

U.S. PATENT DOCUMENTS

| | | | | |
|---|---|---|---|---|
| 4,017,062 A | * | 4/1977 | Zwirner | F01L 1/462 267/166 |
| 4,923,183 A | * | 5/1990 | Saka | F16F 1/042 267/167 |
| 6,375,174 B2 | * | 4/2002 | Hasegawa | B60G 11/14 267/166 |
| 7,766,312 B2 | * | 8/2010 | Takamura | F16F 1/06 267/170 |
| 8,302,438 B2 | * | 11/2012 | Lui | E05B 47/0673 70/277 |
| 10,138,970 B2 | * | 11/2018 | Matsuoto | F16F 1/047 |
| 2001/0035601 A1 | * | 11/2001 | Imaizumi | F16F 1/047 267/286 |
| 2002/0011090 A1 | * | 1/2002 | Hasegawa | B21F 3/10 72/138 |
| 2005/0051937 A1 | * | 3/2005 | Umezawa | F16F 1/126 267/179 |
| 2006/0061024 A1 | * | 3/2006 | Jung | F16F 15/067 267/167 |
| 2009/0230602 A1 | * | 9/2009 | Takamura | F16F 1/06 267/174 |
| 2013/0099435 A1 | * | 4/2013 | Matsuoto | F16F 1/06 267/166 |
| 2014/0010704 A1 | * | 1/2014 | Ishida | C22C 9/01 420/471 |
| 2019/0085927 A1 | * | 3/2019 | Kishihara | F16F 1/047 |
| 2019/0113094 A1 | * | 4/2019 | Watanabe | F16F 1/06 |
| 2021/0190163 A1 | * | 6/2021 | Kishihara | F16F 1/042 |

FOREIGN PATENT DOCUMENTS

| | | |
|---|---|---|
| JP | 2000-205320 | 7/2000 |
| JP | 2005-016645 | 1/2005 |
| JP | 2012-211702 | 11/2012 |

OTHER PUBLICATIONS

International Preliminary Report on Patentability issued in PCT/JP2017/004338 dated Oct. 25, 2018.

Extended European Search Report issued in European Application No. 21152995.3, dated May 31, 2021, 7 pages.

* cited by examiner

FIG. 7 ized.

COIL SPRING

FIELD OF THE INVENTION

The present invention relates to a coil spring available for a valve spring for an internal combustion engine, a spring for a high-pressure pump, and the like.

BACKGROUND ART

A coil spring obtained by forming a spring wire into a helical shape that axially extends from one side toward the other side is widely used as a valve spring for an internal combustion engine, a spring for a high-pressure pump, and the like.

This coil spring is a component intended to axially exert elastic force when axially compressed, and is known to also produce, in addition to the elastic force in the axial direction, force (lateral force) in the direction perpendicular to the axial direction when compressed.

Desirably, production of lateral force is prevented as much as possible.

That is to say, for example, when lateral force is produced in the case of using the coil spring as a pressing member for pressing a reciprocating plunger, frictional force produced between the plunger and the guide surface where the plunger is reciprocally accommodated is increased.

An increased frictional force leads to increased wear and frictional heat due to sliding resistance to the plunger, and may result in operational problems of an apparatus such as a high-pressure pump where the plunger is used.

In this regard, the first-listed applicant of the present application has proposed a coil spring for reducing lateral force (see Patent Literature 1 cited below).

The coil spring described in Patent Literature 1 is designed such that the number of active coils between the set height and the maximum height during use is an integer, and thus the coil spring is capable of reducing lateral force compared with coil springs that do not have an integer or near-integer number of active coils.

Meanwhile, the coil spring has end coil parts located at the respective axial ends and a central coil part located between the end coil parts, and the region where there is a space between axially adjacent coils (a space between coils) corresponds to the active coil part.

Patent Literature 1 discloses the concept of designing a spring such that the number of coils in the active coil part is an integer, but does not describe a specific configuration that does not allow the number of coils in the active coil part to change during use.

PRIOR ART DOCUMENT

Patent Literature

Patent Literature 1: JP 2000-205320

DISCLOSURE OF THE INVENTION

The present invention has been conceived in view of such conventional art, and an object of the present invention is to provide a coil spring capable of preventing production of lateral force as much as possible.

In order to achieve the object, the present invention provides a coil spring having a spring wire formed into a helical shape axially extending from one side to the other side, wherein a helical space defined by a space between coils that are adjacent to each other in an axial direction has a first end region wherein the space between coils in the natural length state is increased from a first reference point, where the space between coils in the natural length state is zero, circumferentially toward the other side in the axial direction along the helical shape, a reference region located closer to the other side in the axial direction than the first end region is, wherein the space between coils in the natural length state is at a reference value L (L>0), and a second end region located closer to the other side in the axial direction than the reference region is, wherein the space between coils is reduced circumferentially toward the other side in the axial direction along the helical shape and the space between coils in the natural state is zero at a second reference point; the first end region is configured such that the number of turns of the helical space is greater than 1 and the distance of space between coils in the natural length state in a terminal position is greater than the reference value L; and the helical space has a first transitional region between the terminal position of the first end region and the reference region, the first transitional region being configured so that the distance of space between coils is reduced from the terminal position of the first end region along the helical shape of the helical space toward the other side in the axial direction and becomes the reference value L.

In the coil spring according to the present invention, the helical space defined by the space between coils that are adjacent to each other in an axial direction has the first end region whose space between coils in the natural length state is increased as it extends from a first reference point, where the space between coils in the natural length state is zero, circumferentially toward the other side in the axial direction along the helical shape, the reference region located closer to the other side in the axial direction than the first end region is, wherein the space between coils in the natural length state is set to the reference value L (L>0), and the second end region located closer to the other side in the axial direction than the reference region is, wherein the space between coils in the natural state is reduced at it extends circumferentially toward the other side in the axial direction along the helical shape and becomes zero at the second reference point. The first end region is configured such that the number of turns of the helical space is greater than 1 and the distance of space between coils in the natural length state in a terminal position is greater than the reference value L. The helical space also have a first transitional region between the terminal position of the first end region and the reference region, the first transitional region being configured so that the distance of space between coils is reduced from the terminal position of the first end region along the helical shape of the helical space toward the other side in the axial direction and becomes the reference value L. The thus configured coil spring makes it possible to effectively prevent the space between coils from becoming zero in the first end region during compressional operation, and it is thus possible to effectively suppress production of lateral force.

Preferably, the first end region is configured to have a constant pitch angle of the space between coils from the first reference point to the terminal position, and the pitch angle of the space between coils is set such that the displacement of the space between coils per turn of the helical space toward the other side in the axial direction is L.

The coil spring according to the present invention may include a first end coil part having a first bearing surface that is arranged on one side in the axial direction of the coil spring and faces one side in the axial direction of the coil spring, a second end coil part having a second bearing surface that is arranged on the other side in the axial direction of the coil spring and faces the other side in the axial direction of the coil spring, and a central coil part between the first and second end coil parts.

Preferably, the first end coil part is configured to include a first end coil part edge region that extends from a first end on one side in the longitudinal direction of the spring wire to a part forming the first reference point, and a first end coil part transitional region that extends from the first end coil edge region to the central coil part. The first end coil part edge region is bent toward one side in the axial direction of the coil spring as compared with the first end coil part transitional region.

The first bearing surface is configured to extend from the first end coil part edge region to the first end coil part transitional region across a border between the first end coil part edge region and the first end coil part transitional region.

In any one of the above configurations, preferably, the second end region is configured such that the number of turns of the helical space is greater than 1 and the distance of space between coils in the natural length state in a starting position is greater than the reference value L, and the helical space is configured to have a second transitional region between the terminal position of the reference region and the starting position of the second end region, the second transitional region being configured so that the distance of space between coils is increased from the reference value L as it extends from the terminal position of the reference region along the helical shape of the helical space toward the other side in the axial direction until the starting position of the second end region.

Preferably, the second end region is configured to have a constant pitch angle of the space between coils from the starting position to the second reference point, and the pitch angle of the space between coils is set such that the displacement of the space between coils per turn of the helical space toward the other side in the axial direction is −L.

Preferably, the second end coil part is configured to include a second end coil part edge region that extends from a second end on the other side in the longitudinal direction of the spring wire to a part forming the second reference point, and a second end coil part transitional region that extends from the second end coil edge region to the central coil part. The second end coil part edge region being bent toward the other side in the axial direction of the coil spring as compared with the second end coil part transitional region.

The second bearing surface is configured to extend from the second end coil part edge region to the second end coil part transitional region across a border between the second end coil part edge region and the second end coil part transitional region.

In any one of the above configurations, preferably, the number of turns of helical space from the first reference point to the second reference point is an integral multiple.

EMBODIMENT FOR CARRYING OUT THE INVENTION

Below, one embodiment of the coil spring according to the present invention will now be described with reference to the attached drawings.

Figure 1:
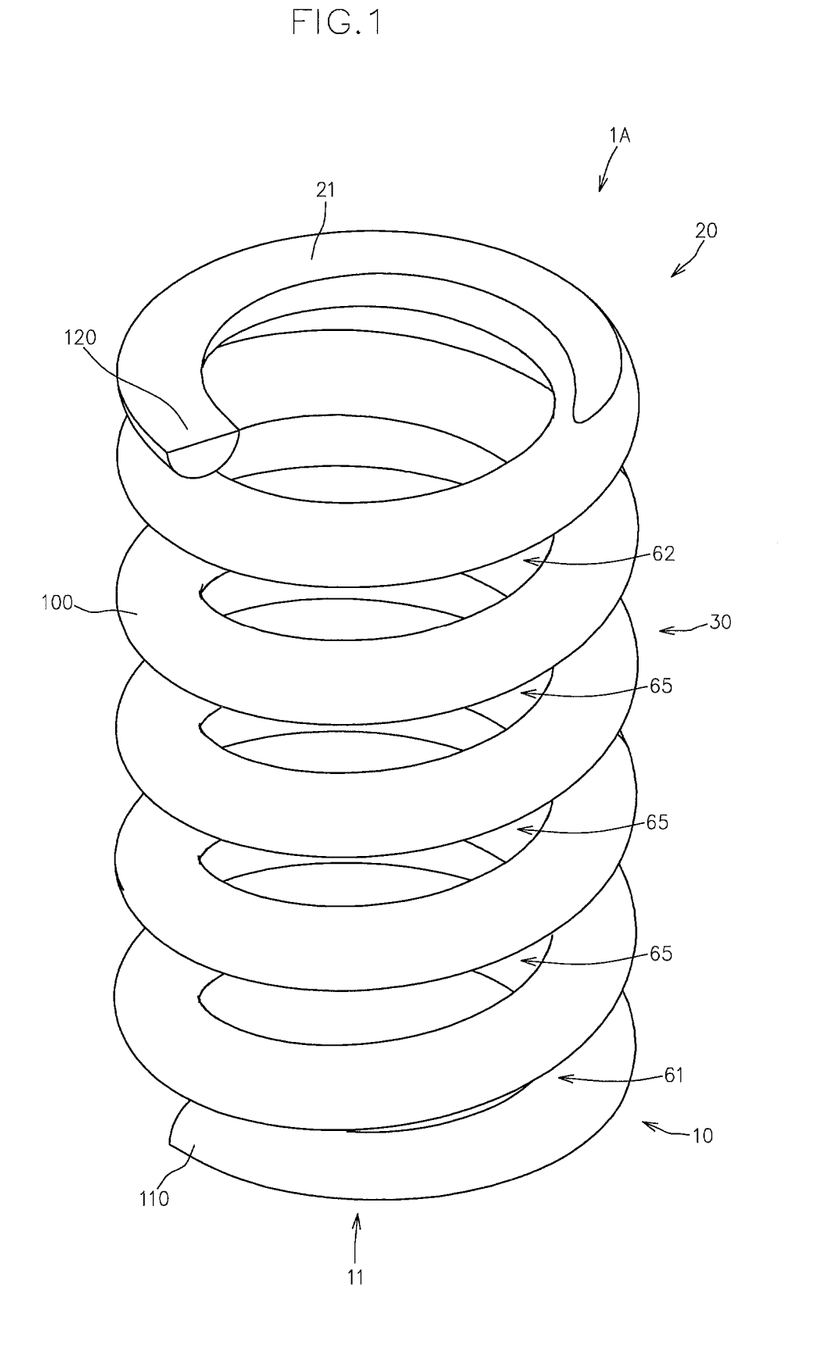
FIG. 1 is a perspective view of a coil spring according to one embodiment of the present invention, showing the coil spring in a natural length state.
Figure 2:
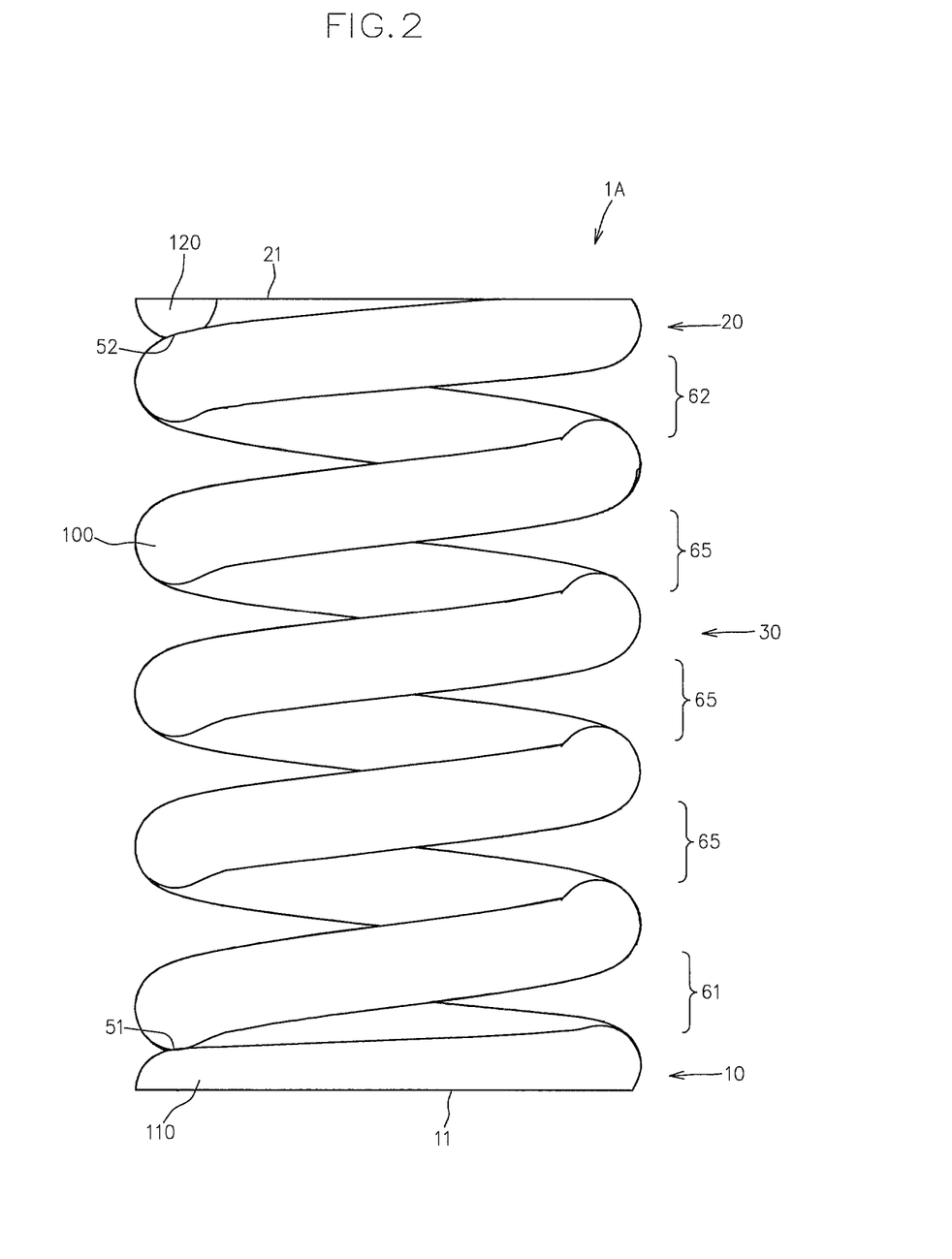
FIG. 2 is a front view of the coil spring in a natural length state.

FIGS. 1 and 2 show a perspective view and a front view, respectively, of a coil spring 1A according to the present embodiment in a natural length state.

As shown in FIGS. 1 and 2, the coil spring 1A according to the present embodiment is obtained by forming a spring wire 100 into a helical shape axially extending from one side to the other side, and is suitably used as a valve spring for an internal combustion engine, a spring for a high-pressure pump, and the like.

In reference to the coiling of the spring wire 100, the coil spring 1A has a first end coil part 10 including a first end 110 on one side in the longitudinal direction of the spring wire 100 and having a first bearing surface 11 facing one side in the axial direction of the coil spring 1A; a second end coil part 20 including a second end 120 on the other side in the longitudinal direction of the spring wire 100 and having a second bearing surface 21 facing the other side in the axial direction of the coil spring 1A; and a central coil part 30 between the first and second end coil parts 10, 20.

In the coil spring 1A, the region where there is a space between the coils of the spring wire 100 adjacent in the axial direction of the coil spring 1A acts as an active coil part that exerts elastic force.

Hereafter, the space between the axially adjacent coils of the spring wire 100 will now be described in detail.

On one side in the axial direction, the space between coils is increased from a first reference point 51, where the space between coils in the natural length state is zero, helically toward the other side in the axial direction; in the central coil part 30, the space between coils is at a reference value L (L>0, see FIG. 3 below) that is set according to the required elastic force of the coil spring 1A; and on the other side in the axial direction, the space between coils is reduced helically toward the other side in the axial direction and is zero at a second reference point 52.

That is to say, as shown in FIG. 2, the helical shape (hereinafter referred to as helical space) formed by the space between coils has, on one side in the axial direction, a first end region 61 wherein the space between coils in the natural length state is increased from the first reference point 51, where the space between coils in the natural length state is zero, circumferentially toward the other side in the axial direction along the helical shape; a reference region 65 located closer to the other side in the axial direction than the first end region 61 is, wherein the space between coils in the natural length state is at the reference value L; and a second end region 62 located closer to the other side in the axial direction than the reference region 65 is, wherein the space between coils is reduced circumferentially toward the other side in the axial direction along the helical shape, and the space between coils in the natural state is zero at the second reference point 52.

Figure 3:
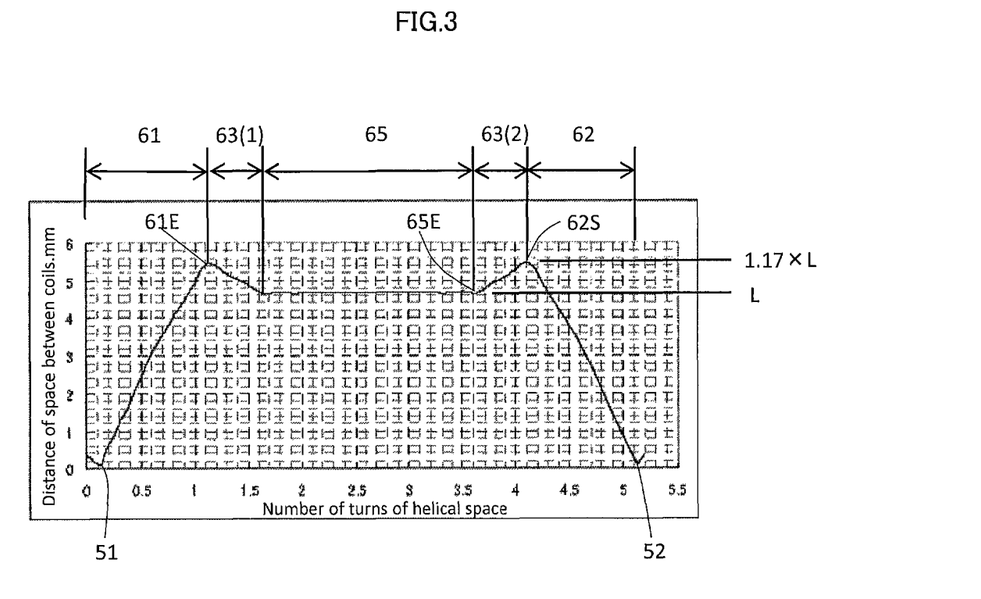
FIG. 3 is a graph showing the relationship between the number of turns of helical space and the distance of space between coils in the coil spring.

FIG. 3 is a graph showing the relationship between the number of turns of helical space and the distance of space between coils in the coil spring 1A.

As shown in FIG. 3, in the coil spring 1A according to the present embodiment, the first end region 61 is configured such that the number of turns of the helical space is greater than 1 and the distance of space between coils in the natural length state in a terminal position 61E is greater than the reference value L.

In the present embodiment, as shown in FIG. 3, the terminal position 61E of the first end region 61 is located at a position corresponding to about 1.2 turns of the helical space from the first reference point 51 toward the other side in the axial direction; the reference value L is set at 4.7 mm; and the distance of space between coils in the natural length state in the terminal position 61E is set at 5.5 mm (reference value L×1.17).

Moreover, as shown in FIG. 3, the coil spring 1A is configured such that the helical space has a first transitional region 63(1) between the first end region 61 and the reference region 65.

The first transitional region 63(1) is configured such that the distance of space between coils is reduced from the terminal position 61E of the first end region 61 along the helical shape of the helical space toward the other side in the axial direction and becomes the reference value L.

This configuration makes it possible to effectively prevent the space between coils from becoming zero in the first end region 61 when the coil spring 1A is compressed from the natural length state, and it is thus possible to effectively suppress production of lateral force during compressional operation.

That is to say, in the coil spring 1A, the distance of space between coils at the terminal position 61E of the first end region 61 provided on one side in the axial direction is greater than the reference value L.

Figure 4:
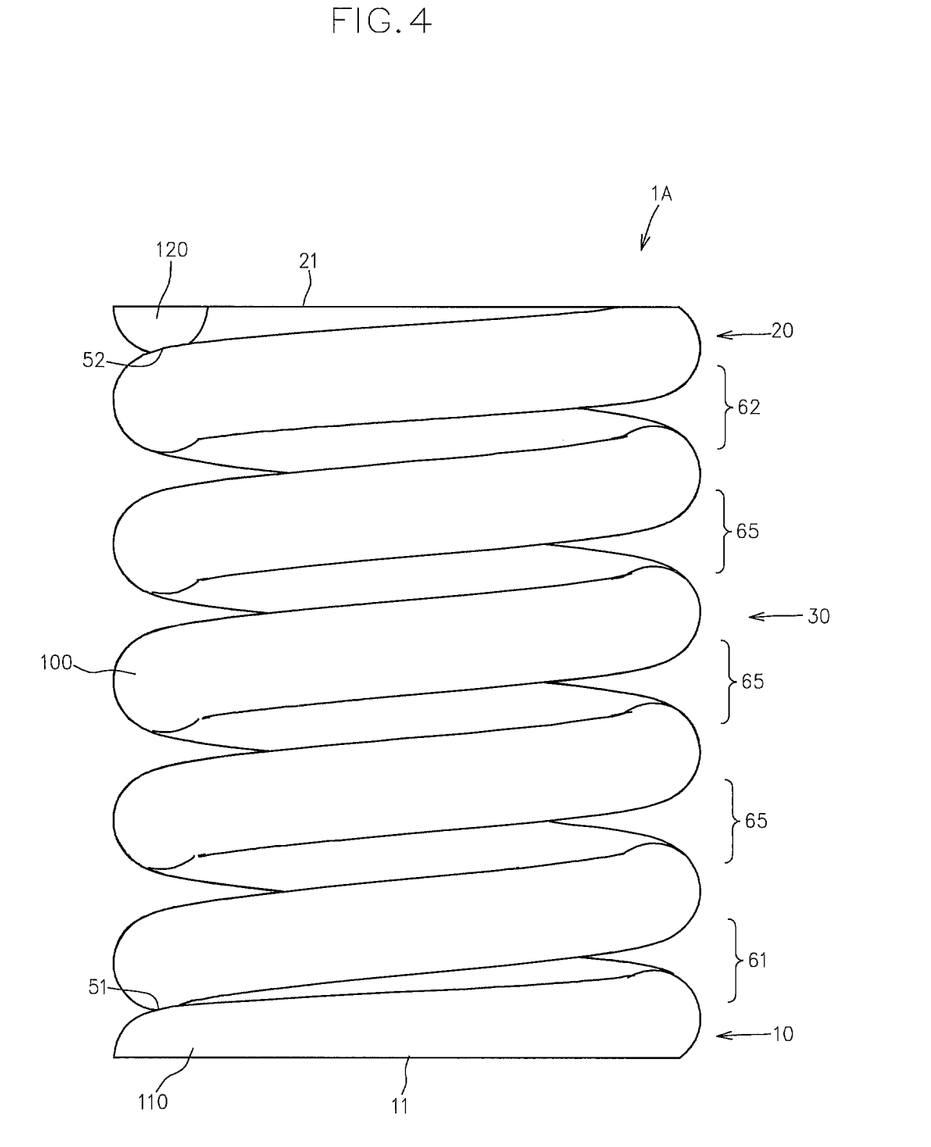
FIG. 4 is a front view of the coil spring in a compressed state.

Accordingly, it is possible to effectively prevent compressional operation of the coil spring 1A as shown in FIG. 4 from resulting in a change in the number of active coils on one side in the axial direction, and it is thereby possible to effectively suppress production of lateral force during compressional operation.

As shown in FIG. 3, in the coil spring 1A according to the present embodiment, the second end region 62 is configured such that the number of turns of helical space is greater than 1 and the distance of space between coils in the natural length state in the starting position 61S is greater than the reference value L.

In the present embodiment, the second end region 62 has a configuration substantially identical to the first end region 61.

That is to say, as shown in FIG. 3, the starting position 62S of the second end region 62 is located at a position corresponding to about 1.2 turns of the helical space from the second reference point 52 toward one side in the axial direction; and the distance of space between coils in the natural length state at the starting position 62S is set at 5.5 mm (reference value L×1.17), which is identical to the distance of space between coils at the terminal position 61E of the first end region 61.

Moreover, as shown in FIG. 3, the coil spring 1A is configured such that the helical space has a second transitional region 63(2) between the reference region 65 and the second end region 62.

The second transitional region 63(2) is configured such that the distance of space between coils is increased from the reference value L as it extends from a terminal position 65E of the reference region 65 along the helical shape of the helical space toward the other side in the axial direction until the starting position 62S of the second end region 62.

This configuration makes it possible to effectively prevent the space between coils from becoming zero in the second end region 62 when the coil spring 1A is compressed from the natural length state, and it is thus possible to effectively suppress production of lateral force during compressional operation.

Figure 5:
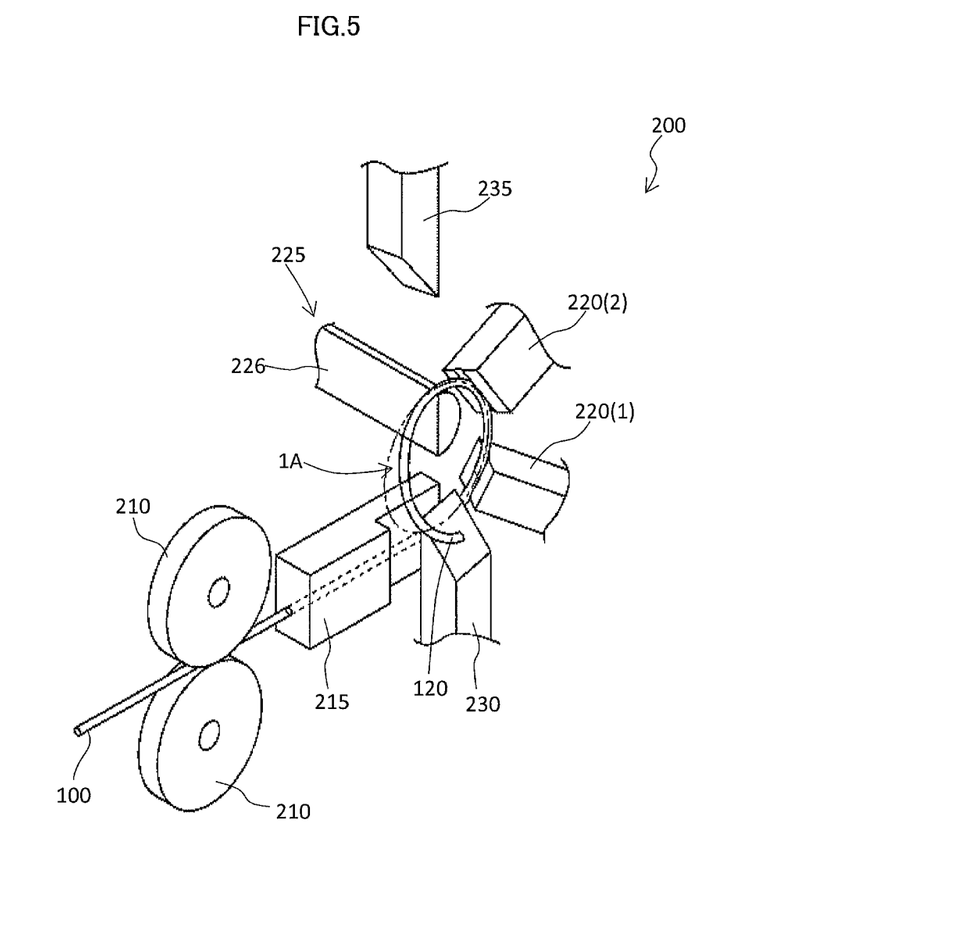
FIG. 5 is a schematic view of a manufacturing apparatus for the coil spring.

The coil spring 1A can be manufactured with, for example, a manufacturing apparatus 200 shown in FIG. 5.

As shown in FIG. 5, the manufacturing apparatus 200 has feed rollers 210 for feeding the spring wire 100; a guide member 215 for guiding the spring wire 100 conveyed by the feed rollers 210; first and second coiling tools 220(1), 220(2) provided downstream in the conveying direction of the spring wire 100 that is conveyed by the feed rollers 210 while being guided by the guide member 215, wherein the first and second coiling tools 220(1), 220(2) forming the helical coil spring 1A from the linear spring wire 100; a core metal member 225 for guiding the coil spring 1A formed into a helical shape by the first and second coiling tools 220(1), 220(2); a pitch tool 230 for adjusting the pitch of the coil spring 1A; and a cutting tool 235 for cutting the spring wire 100 in cooperation with the core metal 225.

The positions of the first and second coiling tools 220(1), 220(2) can be adjusted in the radial direction with reference to the center of the coil spring 1A to be formed, and the coil diameter of the coil spring 1A is changed in accordance with the change of the radial positions of the first and second coiling tools 220(1), 220(2).

The position of the pitch tool 230 can be adjusted in the radial direction with reference to the center of the coil spring 1A, and the pitch of the coil spring 1A is changed in accordance with the change of the radial position of the pitch tool 230.

The cutting tool 235 is radially reciprocable with reference to the center of the coil spring 1A, and is movable between a cutting position for cutting the spring wire 100 in cooperation with an engagement surface 226 of the core metal 225 and a retreated position away from the core metal 225.

Preferably, as shown in FIG. 3, the first end region 61 has a constant pitch angle of the space between coils from the first reference point 51 to the terminal position 61E, and the pitch angle of the space between coils is set such that the displacement of the space between coils per turn of the helical space toward the other side in the axial direction is L.

This configuration facilitates the positioning control of the pitch tool 230.

Likewise, preferably, as shown in FIG. 3, the second end region 62 has a constant pitch angle of the space between coils from the starting position 62S to the second reference point 52, and the pitch angle of the space between coils is set such that the displacement of the space between coils per turn of the helical space toward the other side in the axial direction is −L.

Hereafter, the results of experiments concerning lateral force performed on the coil spring 1A according to the present embodiment and a conventional coil spring will now be described.

As an example (a working example) of the coil spring 1A according to the present embodiment, a coil spring 1a having the following configuration was provided.

Figure 6:
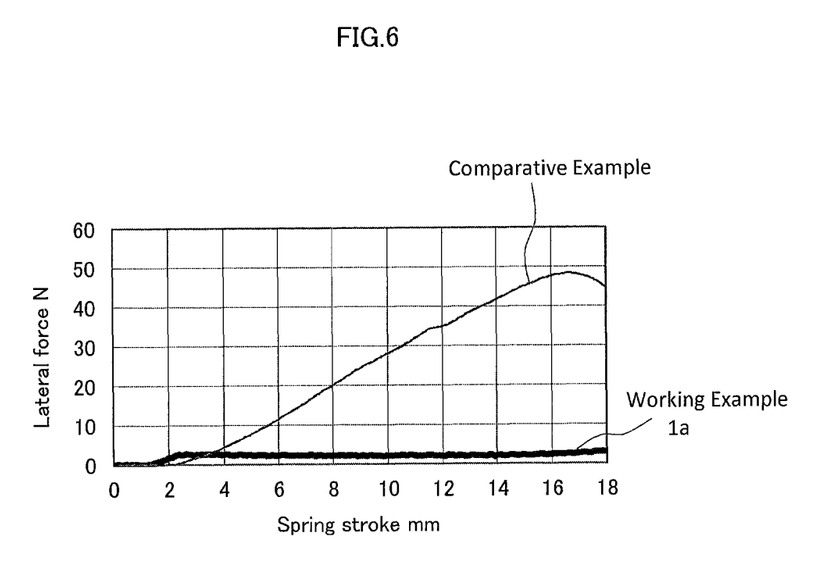
FIG. 6 is a graph showing an experiment result.

Configuration of Coil Spring 1a According to Working Example:
Material of spring wire: Steel wire corresponding to silicon chromium oil tempered wire (SWOSC-V)
Wire diameter of spring wire: 3.3 mm
Coil diameter of coil spring: 17.4 mm
Length of coil spring in natural length state: 41 mm
Total number of coils: 6.0
Number of active coils: 4.0
Distance (reference value L) of space between coils in reference region 65: 4.6 mm
Terminal position 61E of first end region 61 (number of turns of helical space from the first reference point 51): 0.9
Distance of space between coils in terminal position 61E of first end region 61: 5.7 mm
Number of turns of helical space in the first transitional region 63(1): 0.5
Starting position 62S of the second end region 62 (number of turns of helical space from the second reference point 52): 0.9
Distance of space between coils in starting position 62S of second end region 62: 5.7 mm
Number of turn of helical space in the second transitional region 63(2): 0.5
Lateral force produced by the coil spring 1a of the working example was measured with a side force spring tester (SFT Series, manufactured by Japan Instrumentation System Co., Ltd.).
The results are shown in FIG. 6.
As an example (a comparative example) of a conventional coil spring, a coil spring having the following configuration was provided, and a similar experiment was conducted.
Configuration of Coil Spring According to Comparative Example:
Material of spring wire: Steel wire corresponding to silicon chromium oil tempered wire (SWOSC-V)
Wire diameter of spring wire: 3.3 mm
Coil diameter of coil spring: 17.4 mm
Length of coil spring in natural length state: 40 mm
Total number of coils: 5.8
Number of active coils: 3.8
Distance (reference value L) of space between coils in reference region 65: 6.1 mm
Terminal position 61E of first end region 61 (number of turns of helical space from the first reference point 51): 1
Distance of space between coils in terminal position 61E of first end region 61: 6.1 mm
Starting position 62S of Second end region 62 (number of turns of helical space from the second reference point 52): 1
Distance of space between coils in starting position 62S of second end region 62: 6.1 mm
Lateral force produced by the comparative example was also measured with the side force spring tester (SFT Series, manufactured by Japan Instrumentation System Co., Ltd.).
The results are shown in FIG. 6 as well.
As shown in FIG. 6, in the working example 1a wherein the number of turns of helical space in the first and second end regions 61, 62 is greater than 1, and the distance of space between coils in the terminal position 61E of the first end region 61 and in the starting position 62S of the second end region 62 is greater than the distance of space between coils L in the reference region 65, production of lateral force is significantly suppressed as compared with the comparative example.
This result means that with the coil spring 1a according to the working example, it is possible to effectively prevent the space between coils from becoming zero in the first and second end regions 61, 62 during compressional operation.

Preferably, the coil spring 1A is configured such that the number of turns of helical space from the first reference point 51 to the second reference point 52 is an integral multiple.

That is to say, the coil spring 1A is configured such that the first reference point 51 and the second reference point 52 are located in circumferentially the same positions.

This configuration makes it possible to more effectively prevent production of lateral force during compressional operation.

Preferably, a region of the first end coil part 10, which is located closer to the end side than the first reference point 51 is, can be bent toward one side in the axial direction.

Figure 7:
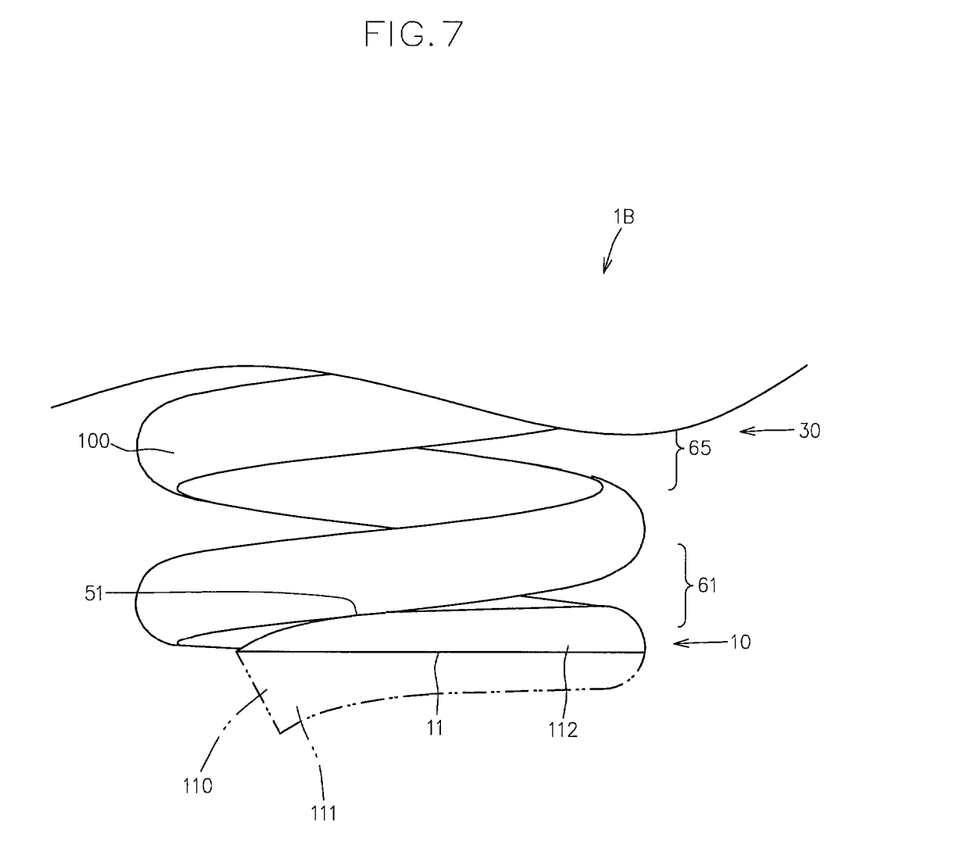
FIG. 7 is a partial front view of a coil spring according to a modification of the embodiment.

FIG. 7 shows a partial front view of a modification 1B wherein a region of the first end coil part 10, which is located more toward the end side than the first reference point 51 is, is bent toward one side in the axial direction.

As shown in FIG. 7, in the modification 1B, the first end coil part 10 includes a first end coil part edge region 111 extending from a first end 110 on one side in the longitudinal direction of the spring wire 100 to a part that forms the first reference point 51, and a first end coil part transitional region 112 extending from the first end coil edge region 111 to the central coil part 30.

The first end coil part edge region 111 is bent toward one side in the axial direction of the coil spring 1B as compared with the first end coil part transitional region 112, and the first bearing surface 11 is formed so as to cross the border shared with the first end coil part transitional region 112 from the first end coil part edge region 111 and reach the first end coil part transitional region 112.

The modification 1B having this configuration makes it possible to provide a thick first end coil part 10 while ensuring the flatness of the first bearing surface 11 by sufficiently securing the amount by which the first bearing surface 11 can be polished, and thus makes it possible to further reduce production of lateral force during compressional operation.

Naturally, the same configuration is also applicable to the second end coil part 20.

That is to say, it is possible that the second end coil part 20 includes a second end coil part edge region (not shown) extending from a second end 120 on the other side in the longitudinal direction of the spring wire 100 to a part that forms the second reference point 52, and a second end coil part transitional region (not shown) extending from the second end coil edge region to the central coil part 30, and that the second end coil part edge region is bent toward the other side in the axial direction of the coil spring 1 as compared with the second end coil part transitional region, and the second bearing surface 21 is formed so as to cross the border shared with the second end coil part transitional region from the second end coil part edge region and reach the second end coil part transitional region.

DESCRIPTION OF THE REFERENCE NUMERALS 1A, 1B Coil spring
10 First end coil part
11 First bearing surface
20 Second end coil part
21 Second bearing surface
30 Central coil part
51 First reference point 52 Second reference point
61 First end region
61E Terminal position of first end region
62 Second end region
62S Starting position of second end region
63(1) First transitional region
63(2) Second transitional region
65 Reference region
65E Terminal position of reference region
100 Spring wire
110 First end of spring wire
111 First end coil edge region
112 First end coil part transitional region

The invention claimed is:

1. A coil spring having a spring wire formed into a helical shape axially extending from one side to the other side, the coil spring comprising:
a first end coil part having a first bearing surface that is arranged on one side in the axial direction of the coil spring and faces one side in the axial direction of the coil spring;
a second end coil part having a second bearing surface that is arranged on the other side in the axial direction of the coil spring and faces the other side in the axial direction of the coil spring;
a central coil part between the first and second end coil parts;
a helical space defined by a space between coils that are adjacent to each other in an axial direction has a first end region wherein the space between coils in the natural length state is increased from a first reference point, where the space between coils in the natural length state is zero, circumferentially toward the other side in the axial direction along the helical shape, a reference region located closer to the other side in the axial direction than the first end region is, wherein the space between coils in the natural length state is at a reference value L (L>0), and a second end region located closer to the other side in the axial direction than the reference region is, wherein the space between coils is reduced circumferentially toward the other side in the axial direction along the helical shape and the space between coils in the natural state is zero at a second reference point,
the first end region is configured such that the number of turns of the helical space is greater than 1 and the distance of the space between coils in the natural length state in a terminal position is greater than the reference value L, and
the helical space has a first transitional region between the terminal position of the first end region and the reference region, the first transitional region being configured so that the distance of the space between coils is reduced from the terminal position of the first end region along the helical shape of the helical space toward the other side in the axial direction and becomes the reference value L,
wherein the first end coil part includes a first end coil part edge region that extends from a first end on one side in the longitudinal direction of the spring wire to a part forming the first reference point, and a first end coil part transitional region that extends from the first end coil edge region to the central coil part,
wherein the first end coil part edge region being bent toward one side in the axial direction of the coil spring as compared with the first end coil part transitional region, and
wherein the first bearing surface extending from the first end coil part edge region to the first end coil part transitional region across a border between the first end coil part edge region and the first end coil part transitional region.

2. The coil spring according to claim 1, wherein
the first end region has a constant pitch angle of the space between coils from the first reference point to the terminal position, and
the pitch angle of the space between coils is set such that the displacement of the space between coils per turn of the helical space toward the other side in the axial direction is L.

3. The coil spring according to claim 1, wherein
the second end region is configured such that the number of turns of the helical space is greater than 1 and the distance of the space between coils in the natural length state in a starting position is greater than the reference value L, and
the helical space has a second transitional region between the terminal position of the reference region and the starting position of the second end region, the second transitional region being configured so that the distance of the space between coils is increased from the reference value L as it extends from the terminal position of the reference region along the helical shape of the helical space toward the other side in the axial direction until the starting position of the second end region.

4. The coil spring according to claim 3, wherein the second end region has a constant pitch angle of the space between coils from the starting position to the second reference point; and
the pitch angle of the space between coils is set such that the displacement of the space between coils per turn of the helical space toward the other side in the axial direction is -L.

5. The coil spring according to claim 1,
wherein the second end coil part includes a second end coil part edge region that extends from a second end on the other side in the longitudinal direction of the spring wire to a part forming the second reference point, and a second end coil part transitional region that extends from the second end coil edge region to the central coil part,
wherein the second end coil part edge region is bent toward the other side in the axial direction of the coil spring as compared with the second end coil part transitional region, and
wherein the second bearing surface extends from the second end coil part edge region to the second end coil part transitional region across a border between the second end coil part edge region and the second end coil part transitional region.

6. The coil spring according to claim 1, wherein the number of turns of the helical space from the first reference point to the second reference point is an integral multiple.

* * * * *

UNITED STATES PATENT AND TRADEMARK OFFICE
CERTIFICATE OF CORRECTION

PATENT NO.         : 11,181,160 B2
APPLICATION NO.    : 16/093496
DATED              : November 23, 2021
INVENTOR(S)        : Kishihara et al.

Page 1 of 1

It is certified that error appears in the above-identified patent and that said Letters Patent is hereby corrected as shown below:

On the Title Page

Column 1, Item (73), in "Assignee", Line 1, delete "Corporation" and insert -- Corporation, Kyoto (JP); Toyota Jidosha Kabushiki Kaisha, Toyota (JP) --, therefor.

Signed and Sealed this
Twenty-ninth Day of March, 2022

Drew Hirshfeld
*Performing the Functions and Duties of the*
*Under Secretary of Commerce for Intellectual Property and*
*Director of the United States Patent and Trademark Office*